United States Patent [19]

Ben-Dror

[11] Patent Number: 5,349,779
[45] Date of Patent: Sep. 27, 1994

[54] ADJUSTABLE CLASP FOR SUSPENDING PLANTS

[75] Inventor: Michael Ben-Dror, Merom Hagalil, Israel

[73] Assignee: Paskal Avizarey Kshira Ltd., Tefen, Israel

[21] Appl. No.: 27,681

[22] Filed: Mar. 8, 1993

[30] Foreign Application Priority Data

Mar. 13, 1992 [IL]  Israel ................................ 101223

[51] Int. Cl.⁵ .............................................. A01G 17/06
[52] U.S. Cl. ..................................... 47/44; 24/30.5 P; 24/543
[58] Field of Search ..................... 47/44 L, 47 L; 24/16 PB, 30.5 P, 543

[56] References Cited

U.S. PATENT DOCUMENTS

| | | | |
|---|---|---|---|
| 3,102,311 | 9/1963 | Martin | 24/30.5 P |
| 3,913,187 | 10/1975 | Okada | 24/16 PB |
| 4,372,011 | 2/1983 | Aranyos | 24/16 PB |
| 4,571,787 | 2/1986 | Furutsu | 24/16 PB |
| 4,835,824 | 6/1989 | Durham | 24/543 |
| 5,024,405 | 6/1991 | McGuire | 24/16 PB |
| 5,230,496 | 7/1993 | Shillington | 24/543 |

FOREIGN PATENT DOCUMENTS 8902009 11/1990 Netherlands .................. 47/44 L

*Primary Examiner*—Henry E. Raduazo
*Attorney, Agent, or Firm*—Helfgott & Karas

[57] ABSTRACT

There is provided a novel adjustable clasp for suspending a plant, integrally molded of a semi-rigid polymer material and comprising a pair of arcuate arms hinged together by means of an integral hinge section of reduced thickness which tends to bias apart said arms to an open position of the clasp, which can be closed manually to encircle a portion of the plant, the arms being secured in the closed position by interengaging locking means provided at or adjacent the free ends of the arms, e.g. an integral buckle at the end of one arm capable of irreversibly engaging a plurality of integral retaining teeth provided on the outside of the other arm.

5 Claims, 2 Drawing Sheets

ADJUSTABLE CLASP FOR SUSPENDING PLANTS

This invention provides a novel adjustable clasp for suspending small plants on a support such as a stake, a vertically suspended cord, or a horizontal wire, in order to hold the plant in a desired position.

It is the common practice in large scale culture of plants, particularly vines and the like, to support the stems or branches of the plants by attaching them to support elements such as vertical stakes or horizontally stretched cords or wires. The old troublesome and time consuming technique of tying the stems or branches of the plants to the supports have long since been replaced by the use of clamp (or clip) devices made of inexpensive plastics or similar flexible low cost materials. Such devices are described, e.g. in U.S. Pat. Nos. 3,494,072 and 3,739,525, Dutch Patent Application No. 8402815 and Dutch Patent No. 184038.

All of the above mentioned prior art clamp (or clip) devices are of constant size, i.e. the diameter of the enclosure formed by the closed devices was fixed and no provisions existed for adjusting the size of that enclosure.

It is thus the object of the present invention to provide a clasp for suspending plants which is capable of being adjusted according to need to variable sizes of the enclosure formed upon closing the clasp, so as to accommodate stalks or branches of plants having variable thicknesses.

The above object is attained by the present invention which provides an adjustable clasp for suspending a plant, integrally molded of a semi-rigid polymer material and comprising a pair of arcuate arms hinged together by means of an integral hinge section of reduced thickness which tends to bias apart the free ends of said arms to an open position of the clasp, the arms being manually movable around said hinge section to a closed position of the clasp wherein the free ends of the arms are abutting to form a substantially annular enclosure for encircling a portion of the plant, the arms being secured in said closed position by means of interengaging locking means provided at or adjacent the free ends of the arms, said locking means consisting of a buckle integral with the free end of one arm and a plurality of integral retaining teeth provided on the outside of the free end portion of the other arm and pointing obliquely away from said free end, said teeth having such length, angle and resilience as to permit irreversible passage of said free end portion of the arm through said buckle, but prevent its retraction from the buckle with consequent disengagement of the arms and opening of the clasp.

The clasp according to the invention can be fabricated inexpensively by injection molding of a suitable semi-rigid polymer material e.g. polyethylene or polypropylene.

In order to reinforce the clasp against bending out of the plane of the arms, i.e. the plane of the annular enclosure in the closed position of the clasp, the arcuate arms are preferably provided with reinforcing flanges extending along their inner faces. For example, the arms may have a T-shaped cross section where the vertical limb of the T constitutes the reinforcing flange. Alternatively, the arms may have an H-shaped cross section, whereby the horizontal limb of the H is the reinforcing flange.

In order to facilitate the holding of the clasp by one hand and its locking by one hand (by urging the arms towards each other and inserting the end of the arm provided with the retaining teeth through the aperture of the buckle at the end of the other arm), a pair of curved extensions are advantageously provided in accordance with a preferred embodiment of the invention. Each arm is provided with one such extension integrally connected at its mid-portion with the outer face of the arm. The curved extensions are preferably located so that in the closed position of the clasp, the extensions are about diametrically opposite to each other. Alternatively, one of the set of curved extensions can be advantageously connected to the extreme end of the buckle and the other—at about the middle of the other arm which is provided with retaining teeth.

In accordance with a further modification of the invention, the above-mentioned curved extensions are provided along their outer faces with a plurality of parallel ribs extending vertically to the plane of the clasp, in order to prevent slipping of the clasp from the hand of the operator. Similar ribs may also be provided on the outer face of the arm carrying the buckle.

As stated above, the clasp according to the invention, in its open position before use, can be held by two fingers of one hand and the two arcuate arms can be swung manually about the resilient hinge section so as to permit insertion of the free end of the arm provided with the retaining teeth through the aperture of the buckle. The dimensions of the aperture are somewhat smaller than the combined width of the arm and the retaining teeth, but insertion is possible owing to the resilient character of the teeth. The teeth-bearing arm is pushed through the buckle to the desired extent, thereby adjusting the size of the enclosure which encircles the stem or branch of the plant. Once the clasp is closed, the retaining teeth prevent the retraction of the arm which bears them from the buckle. The enclosure within the clasp can be enlarged, or the clasp opened entirely, only by application of considerable force, sufficient to bend the retaining teeth against their initial inclination.

As will be seen below, in the embodiment of the invention illustrated in the accompanying drawings, the arcuate arms are inequal in length and curvatures, the arm bearing the teeth being longer than the arm bearing the buckle. This enables a larger number of retaining teeth to be accommodated along the longer arm, thus affording a wider range of adjustment of the size of the clasp.

One embodiment of the invention will now be described in more detail with the aid of the accompanying non-limiting drawings in which.

Figure 1:
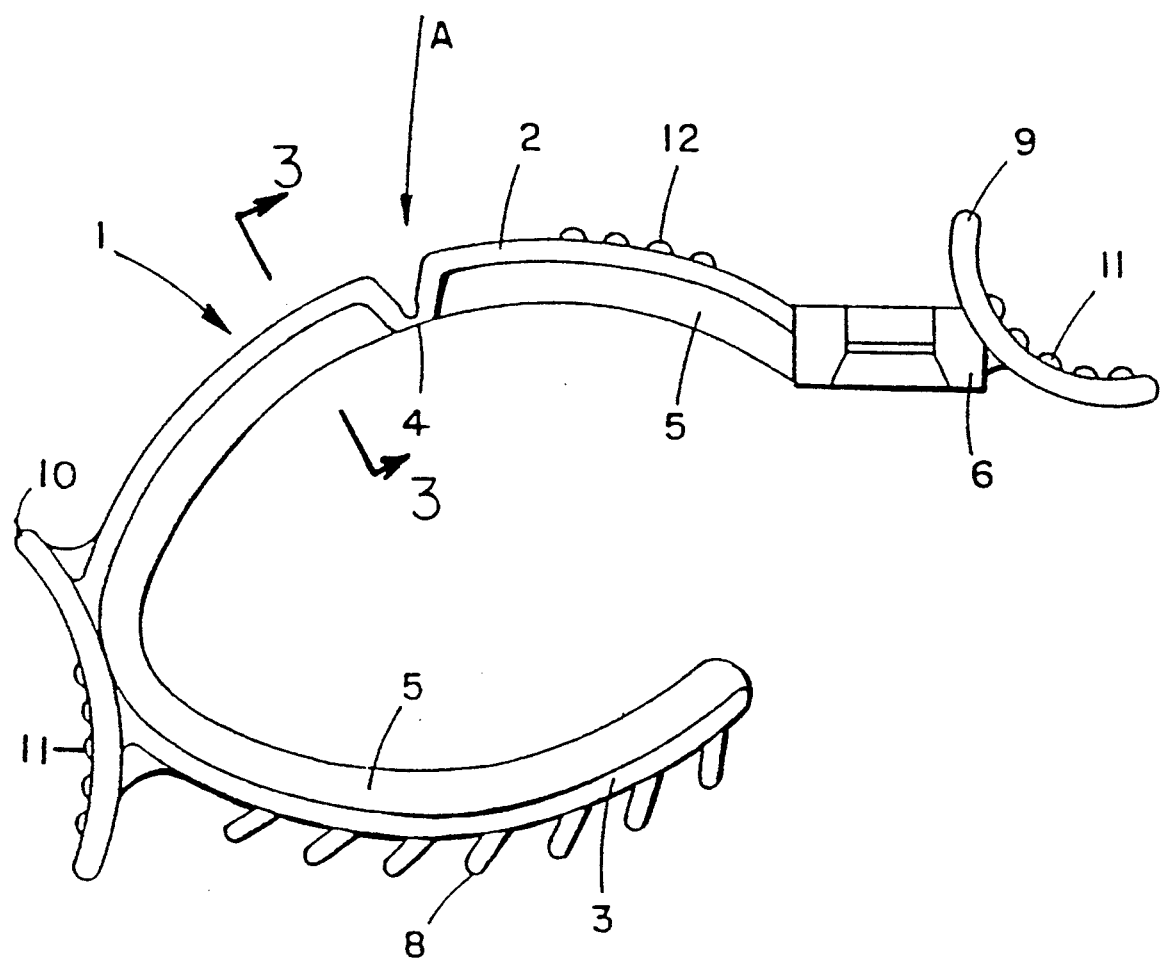
FIG. 1 is a top plan view of the clasp according to the invention in the open condition.
Figure 2:
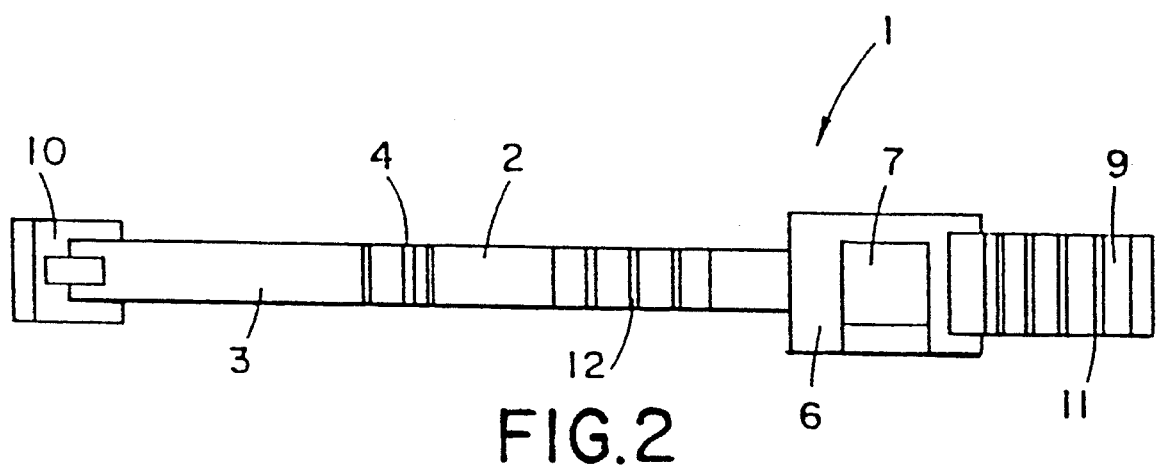
FIG. 2 is a side elevational view of the clasp of FIG. 1 in its open condition when viewed from the direction of the arrow A in FIG. 1.

As seen in FIGS. 1 and 2, the plant suspending clasp according to this embodiment of the invention and generally referenced as 1, is integrally molded of a resilient plastic material, such as polypropylene, and comprises a shorter arcuate arm 2 and a longer arcuate arm 3.

The arcuate arms 2, 3 are hingeally connected to each other by a resilient hinge connection 4 integral with the arms and having a considerably reduced thickness.

Figure 3A:
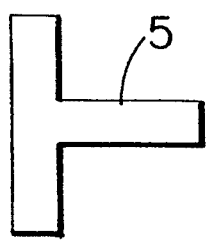
FIG. 3A is a cross-sectional view taken along the line 3—3 of FIG. 1 showing a T-shaped cross section.

Hinge 4 tends to urge the arms 2 and 3 apart defining an open position of the clasp 1. The arms 2 and 3 have a T-shaped cross-section with an inwardly extending central reinforcing limb 5 (except at the hinge portion 4) as shown in FIG. 3A.

Figure 3B:
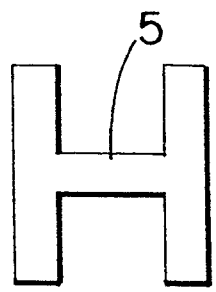
FIG. 3B is a cross-sectional view of an alternate shape to that shown in FIG. 3A.

In accordance with a modification of the above described clasp, the arcuate arms 2 and 3 may possess an H-shaped cross section as shown in FIG. 3B where the central bar of the H is in the plane of the clasp and corresponds to 5 in FIG. 1.

At the free end of the shorter arm 2 there is provided an integral buckle 6 having a square aperture 7 adapted to receive and engage the free end of the longer arm 3. A plurality of retaining teeth 8 are provided equidistantly on the outer face of the longer arm 3 extending obliquely therefrom and pointing away from the free end of the arm 3. For closing the clasp 1, e.g. around a stem of a plant and a supporting stake or wire, the free end of the arm 3 is inserted into aperture 7 of the buckle 6 to a desired distance, whereafter the arms 2 and 3 are retained in this position by the inter-engagement of the buckle 6 with the corresponding retaining teeth 8. It is thus possible to adjust at will the size of the annular enclosure formed by clasp 1 in its closed position.

At the outer end of buckle 6 and at a location about diametrically opposite thereto, roughly at about the middle of the longer arm 3 there are provided a pair of arcuate extensions 9 and 10, having curvatures opposite to the curvatures of the respective arms 2 and 3 and being integrally connected at about their centers to the buckle 6 and the arm 3, respectively. These extensions 9 and 10 facilitate the holding of the clasp 1 between two fingers of one hand and to this end lateral ribs 11 are provided on each curved extension. Similar ribs 12 are also provided on the outer face of the arm for convenient gripping of the clasp between two fingers of one hand.

I claim:

1. An adjustable clasp for suspending a plant, integrally molded of a semi-rigid polymer material and comprising first and second arcuate arms, said second arcuate arm being longer than said first arcuate arm, each of said first and second arcuate arms having first and second ends and being hinged together at their first ends by means of an integral hinge section of reduced thickness which tends to bias apart the second ends of said arms to form an open position of the clasp, the arms being manually movable around said hinge section to a closed position of the clasp, wherein the second ends of the arms are abutting to form a substantially annular enclosure for encircling a portion of the plant, the arms being secured in said closed position by means of interengaging adjustable locking means provided at or adjacent the second ends of the arms, said locking means consisting of a buckle integral with the second end of said first arm and a plurality of integral retaining teeth spacedly provided along an outer circumference of the second end portion of said second arm and pointing obliquely away from said second end, said spacedly provided teeth allowing for adjustment of the clamp size and said teeth also having such length, angle and resilience as to permit irreversible passage of said second end portion of the second arm through said buckle, but prevent its retraction from the buckle with consequent mutual disengagement of the arms and opening of the clasp.

2. A clasp according to claim 1, wherein the arcuate arms have a T-shaped.

3. A clasp according to claim 1, further comprising a pair of curved extensions for easy gripping by the hand, said extensions having curvatures opposite to those of the first and second arms and being integrally connected at their mid-sections to an outer end of the buckle and to an outer face of said second arm, respectively.

4. A clasp according to claim 3, wherein the curved extensions each include outer faces having a plurality of parallel ribs positioned perpendicular to the plane of the closed clasp.

5. A clasp according to claim 1, wherein the arcuate arms have an H-shaped cross-section.

* * * * *